Nov. 9, 1926.
L. W. ANDREWS
1,606,136
MAP HOLDER AND LIKE
Filed Sept. 15, 1924
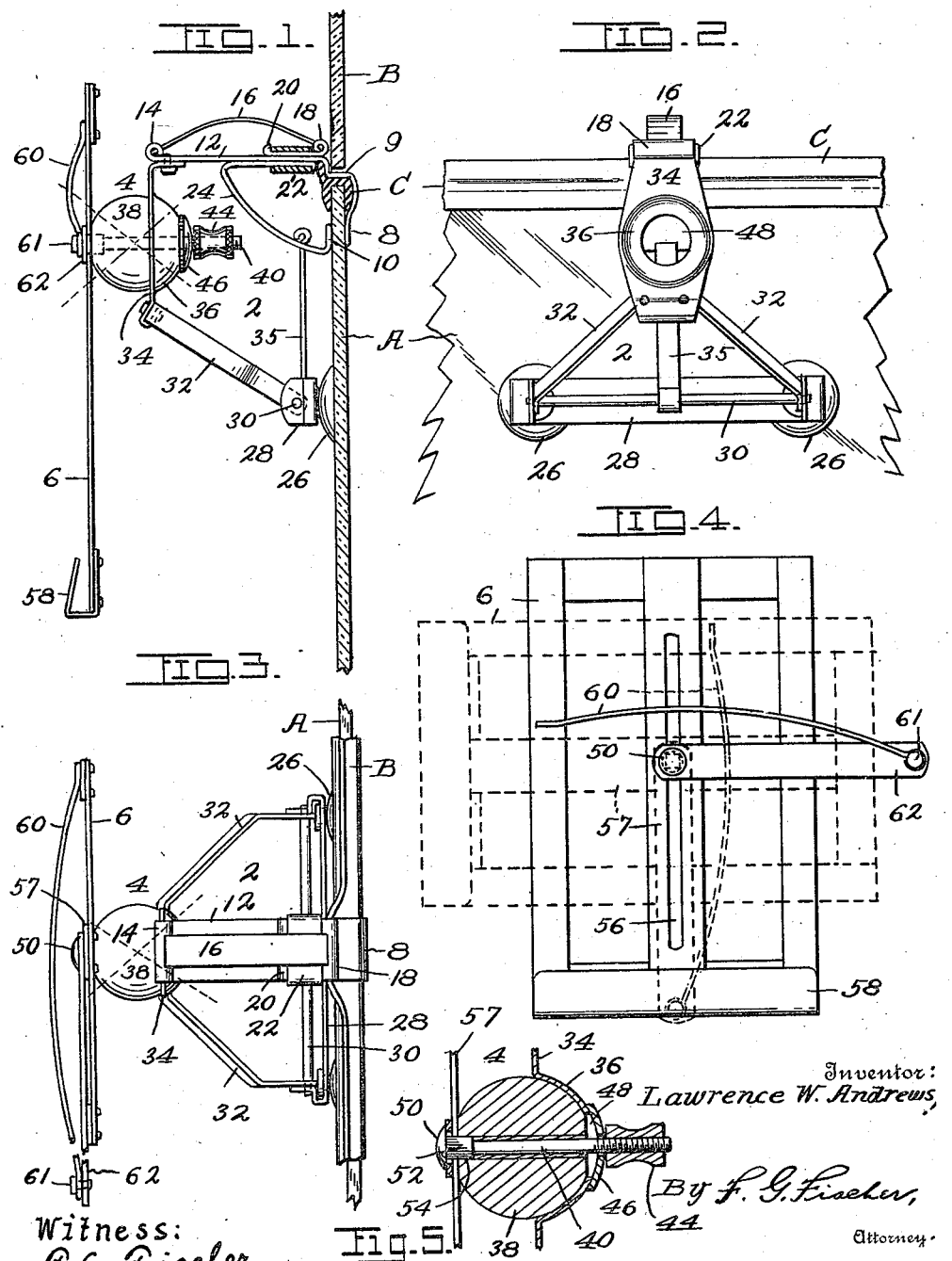
Witness:
P. C. Fischer.
Inventor:
Lawrence W. Andrews,
By F. G. Fischer,
Attorney.

Patented Nov. 9, 1926.

1,606,136

UNITED STATES PATENT OFFICE.

LAWRENCE W. ANDREWS, OF KANSAS CITY, MISSOURI.

MAP HOLDER AND LIKE.

Application filed September 15, 1924. Serial No. 737,869.

My invention relates to map holders and one object is to provide a relatively simple and inexpensive device of this character which may be readily mounted upon the wind shield of a motor vehicle for the purpose of supporting road maps, invoices, lists of addresses or other printed information within plain view of the driver.

A further object is to provide a device of this character which may be mounted at any point along the upper edge of the lower section of the wind-shield, so that it may be located either in front of the driver, or a passenger sitting beside said driver.

Another object is to provide a device of this character which may be adjusted to different angles, to enable the driver or passenger to easily read a map or other article carried by said device.

Other objects will hereinafter appear and in order that the invention may be fully understood, reference will now be had to the accompanying drawing, in which:

Fig. 1 is a side elevation of the device applied to the wind shield of a motor vehicle.

Fig. 2 is a front elevation of the device applied to the wind shield and having the rack and universal joint removed.

Fig. 3 is a plan view of the parts disclosed by Fig. 1.

Fig. 4 is a front elevation of the rack.

Fig. 5 is a vertical section of the universal joint and a portion of the rack.

Referring now in detail to the various parts, A designates the lower section and B the upper section of the wind shield of a motor vehicle, the lower section A being provided with the usual weather strip C.

2, in general, designates a supporting frame which is provided with a universal joint 4 to which a rack 6 is connected to enable the same to be adjusted to different angles to suit the convenience of the user.

The frame 2 embodies jaws 8 and 10 adapted to grip the front and rear surfaces, respectively, of the wind shield section A. The jaw 8 is shaped to conform to the front and top of the weather strip C and has an offset 9 to receive the lower portion of the wind shield section B, as shown by Fig. 1. The jaw 8 is integral with one end of a plate 12 which is formed at its opposite end into an abutment 14 against which one end of a bow spring 16 is seated. The opposite end of said bow spring 16 is seated in an abutment 18 at one end of a slide 20 operably held upon the plate 12 by a sleeve 22.

The jaw 10 is formed on one end of a substantially triangular-shaped plate 24 connected to the sleeve 22 and slidable therewith, so that said jaw 10 may be moved forwardly to grip the rear surface of the wind-shield section A, where it is yieldably held by the bow spring 16.

The supporting frame 2 also embodies a pair of vacuum cups 26 which coact with the jaws 8 and 10 in reliably supporting the frame 2 on the wind shield. Said vacuum cups 26 consist preferably of rubber and are secured to a transverse bar 28 mounted on a pivot 30, so that it may be rocked thereon to permit the cups 26 to be adjusted squarely against the inner surface of the wind shield, Figs. 1 and 2.

The bar 28 is connected by the pivot 30 to the lower ends of a pair of braces 32 rigidly secured at their upper ends to a plate 34, which in turn is connected at its upper end to the plate 12. The pivot 30 is connected to the lower end of a strut 35 which is connected to the plate 24 to stiffen the frame 2.

The socket 36 of the universal joint 4 is formed in the plate 34 to receive the ball 38 constituting the other member of said universal joint. The ball 38 is held at any point of its adjustment in the socket 36 by a bolt 40 which extends through the ball and the socket and is provided at its rear threaded end with a nut 44. A washer 46 is interposed between the nut 44 and the socket 36 to cover the relatively large opening 48 formed in said socket to permit the bolt 40 to move with the ball 38 while the same is being adjusted.

The bolt 40 is provided adjacent to its head 50 with a rectangular portion 52, adapted to fit into a corresponding recess 54 in the ball 38 to prevent said bolt 40 from rotating with the nut 44 when being tightened or loosened. The rectangular portion 52 of the bolt 40 extends through a longitudinal slot 56 in a plate 57 of the rack 6 and prevents the same from rotating independently of said bolt 40.

The rack 6 is equipped at its lower end with an upturned portion 58 to support maps and other articles. Said rack 6 is also equipped with a spring retainer 60 which coacts with the upturned portion 58 in supporting articles and also holds such articles on the rack when the same is turned from the full line to the dotted line position disclosed by Fig. 4. The retainer 60 is connected by a pivot 61 to one end of an arm 62, which is swiveled at its opposite end upon the bolt 40, the bolt head 50 holding said arm against the face of the rack 6.

With the parts constructed and arranged as shown and described, it is apparent that the rack 6 may be arranged at different angles through the intermediacy of the universal joint 4 after loosening the nut 44, or said rack may be rotated axially with the ball 38 to accommodate maps with routes running either vertically or horizontally, and that such maps will be reliably held in position upon the rack 6 and the arm 62 by the retainer 60, which may also be used as a marker for any particular route where more than one is represented on a map. After adjustment of the ball 38 to bring the rack 6 in position so that a map thereon can be easily read by the driver, said ball 38 and the rack 6 are firmly secured from accidental movement by tightening the nut 44.

From the foregoing description it is apparent that I have provided a device embodying the advantages above pointed out, and while I have shown and described the preferred construction, combination and arrangement of parts, I reserve the right to make such changes as properly fall within the spirit and scope of the invention as claimed.

Having thus described my invention, what I claim and desire to secure by Letters Patent, is:

1. In a device of the character described, supporting means embodying two independent jaws adapted to grip a wind shield, a vacuum cup secured to said supporting means at a point below the jaws and adapted to engage said wind shield, and a rack adjustably mounted upon said supporting means and adapted to hold a map.

2. In a device of the character described, supporting means embodying a pair of jaws, spring means mounted upon said supporting means to press said jaws towards each other, vacuum means connected to the lower portion of said supporting means, and a rack connected to said supporting means and capable of holding a map.

3. In a device of the character described, a pair of jaws, spring means to press said jaws towards each other, a plate connected at its upper portion to one of said jaws, braces connected to the lower portion of said plate, a transverse bar pivotally connected to said braces, vacuum means mounted on said bar and adapted to coact with the jaws in engaging a support, and a rack suitably connected to the plate.

4. A device of the character described consisting of a support capable of engaging a wind shield, a rack adjustably associated with said support, an arm adjustably associated with said rack, and a resilient retainer connected to said arm and adapted to coact with the rack in supporting a sheet.

5. In a device of the character described supporting means embodying a jaw adapted to engage over the lower section of a wind shield and conforming to the weather-strip thereon, another jaw to coact with the first jaw in gripping said wind shield section, a sleeve slidably mounted upon the supporting means for adjusting the last-mentioned jaw against the wind shield, a bow spring mounted upon the supporting means for pressing said sleeve towards the wind shield, and map holding means mounted upon the supporting means.

In testimony whereof I affix my signature.

LAWRENCE W. ANDREWS.